2,951,086
METALLO β-CHLORETHYL VINYLPHOSPHONATES

David H. Chadwick, Webster Groves, Mo., assignor to Monsanto Chemical Company, St. Louis, Mo., a corporation of Delaware No Drawing. Filed Jan. 19, 1959, Ser. No. 787,376

8 Claims. (Cl. 260—429.7)

This invention relates to new and useful compounds and to the preparation of same.

The new compounds of this invention may be represented by the structural formula

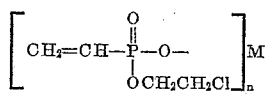

where M is a metal having a valence greater than 1 and where $n$ is the valence of the metal. Among the metals contemplated are magnesium, calcium, zinc, strontium, cadmium, barium, aluminum, tin, lead, antimony, bismuth, arsenic, copper, iron, cobalt and nickel. A preferred group of metals are those of group II of the periodic table.

These new compounds are useful for a variety of purposes. For example, as auxiliary stabilizers with respect to the light stabilization of polyvinylchloride and similar halogenated vinylidene resins. The calcium salt was found to be exceptionally useful in this respect.

As illustrative of the preparation of the new compounds of this invention is the following:

Example I

To a suitable reaction vessel equipped with a vent leading to an ice trap is added approximately 22.2 parts by weight of calcium chloride and approximately 140 parts by weight of di-(β-chlorethyl) vinylphosphonate, [CH$_2$=CHPO(OCH$_2$CH$_2$Cl)$_2$]. The mix is heated in an oil bath at a temperature of about 180–185° C. for about two hours. The viscous plastic mass so obtained is admixed with water and ethyl alcohol and dissolved upon warming on a steam bath. The solution is diluted with acetone and the resultant mass filtered. The filter cake is dissolved in ethyl alcohol and the solution diluted with acetone. Upon filtering and air drying there is obtained 12.2 parts by weight of a white solid identified as calcium β-chlorethyl vinylphosphonate.

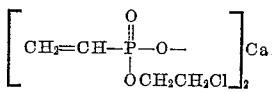

Example II

To a suitable reaction vessel equipped with a vent leading to an ice trap is added approximately 27.2 parts by weight of zinc chloride and approximately 140 parts by weight of di-(β-chlorethyl) vinylphosphonate,

[CH$_2$=CHPO(OCH$_2$CH$_2$Cl)$_2$]

The mix is heated in an oil bath at a temperature of about 200° C. until the evolution of ethylene dichloride ceases. The mass so obtained is admixed with water and ethyl alcohol and dissolved upon warming on a steam bath. The solution is diluted with acetone and the resultant mass filtered. Upon drying there is obtained a solid identified as zinc β-chlorethyl vinylphosphonate.

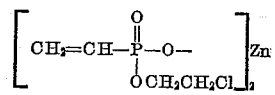

Example III

To a suitable reaction vessel equipped with a vent leading to an ice trap is added approximately 18.3 parts by weight of cadmium chloride and approximately 67 parts by weight of di-(β-chlorethyl) vinylphosphonate, [CH$_2$=CHPO(OCH$_2$CH$_2$Cl)$_2$]. The mix is heated in an oil bath at a temperature of about 200° C. for about three hours. The reaction product so obtained is slurried with ethyl alcohol. The mass is diluted with acetone and filtered. Upon drying the filter cake, a solid identified as cadmium β-chlorethyl vinylphosphonate

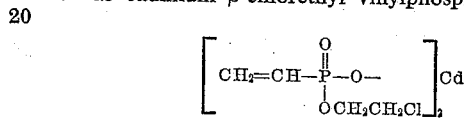

is obtained.

Example IV

To a suitable reaction vessel equipped with a vent leading to an ice trap is added approximately 19.1 parts by weight of magnesium chloride and approximately 140 parts by weight of di-(β-chlorethyl) vinylphosphonate, [CH$_2$=CHPO(OCH$_2$CH$_2$Cl)$_2$]. The mix is heated in an oil bath at a temperature of about 200° C. until the evolution of ethylene dichloride ceases. The mass so obtained is admixed with water and ethyl alcohol and dissolved upon warming on a steam bath. The solution is diluted with acetone and the resultant mass filtered. Upon drying there is obtained a solid identified as magnesium β-chlorethyl vinylphosphonate.

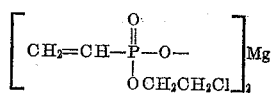

Example V

To a suitable reaction vessel equipped with a vent leading to an ice trap is added approximately 41.6 parts by weight of barium chloride and approximately 140 parts by weight of di-(β-chlorethyl) vinylphosphonate,

[CH$_2$=CHPO(OCH$_2$CH$_2$Cl)$_2$]

The mix is heated in an oil bath at a temperature of about 200° C. until the evolution of ethylene dichloride ceases. The mass so obtained is admixed with water and ethyl alcohol and dissolved upon warming on a steam bath. The solution is diluted with acetone and the resultant mass filtered. Upon drying there is obtained a solid identified as barium β-chlorethyl vinylphosphonate.

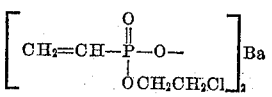

Example VI

To a suitable reaction vessel equipped with a vent leading to an ice trap is added approximately 31.6 parts by weight of strontium chloride and approximately 140 parts by weight of di-(β-chlorethyl) vinylphosphonate, [CH$_2$=CHPO(OCH$_2$CH$_2$Cl)$_2$]. The mix is heated in an oil bath at a temperature of about 200° C. until the evolution of ethylene dichloride ceases. The mass so obtained is admixed with water and ethyl alchol and dissolved upon warming on a steam bath. The solution is diluted with acetone and the resultant mass filtered. Upon drying there is obtained a solid identified as strontium β-chlorethyl vinylphosphonate.

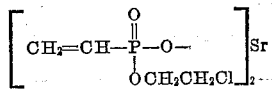

*Example VII*

To a suitable reaction vessel equipped with a vent leading to an ice trap is added approximately 25.2 parts by weight of cobaltous chloride and approximately 140 parts by weight of di(β-chlorethyl) vinylphosphonate, $[CH_2=CHPO(OCH_2CH_2Cl)_2]$. The mix is heated in an oil bath at a temperature of about 200° C. until the evolution of ethylene dichloride ceases. The mass so obtained is admixed with water and ethyl alcohol and dissolved upon warming on a steam bath. The solution is diluted with acetone and the resultant mass filtered. Upon drying there is obtained a solid identified as cobaltous β-chlorethyl vinylphosphonate.

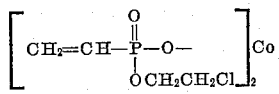

*Example VIII*

To a suitable reaction vessel equipped with a vent leading to an ice trap is added approximately 25.2 parts by weight of nickelous chloride and approximately 140 parts by weight of di-(β-chlorethyl) vinylphosphonate, $$[CH_2=CHPO(OCH_2CH_2Cl)_2]$$

The mix is heated in an oil bath at a temperature of about 200° C. until the evolution of ethylene dichloride ceases. The mass so obtained is admixed with water and ethyl alcohol and dissolved upon warming on a steam bath. The solution is diluted with acetone and the resultant mass filtered. Upon drying there is obtained a solid identified as nickelous β-chlorethyl vinylphosphonate.

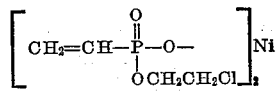

*Example IX*

To a heated reaction vessel vented through a condenser and provided with mechanical agitation there is added 233 parts by weight of bis-(β-chlorethyl) vinylphosphonate, $[CH_2=CHP(O)(OCH_2CH_2Cl)_2]$, and 63.2 parts by weight of anhydrous stannous chloride. The mixture is heated to 200° C., at which temperature ethylene dichloride distills out of the mixture smoothly and rapidly with about two moles per mole of stannous chloride being collected upon heating the mixture at 195–210° C. for one to two hours. A taffy-like mass is obtained on cooling which is successively extracted with ethanol, acetone, and ether followed by drying whereby there is obtained a light tan solid. Analysis of this product showed a content of 19.5% C and 3.0% H compared to values of 21.0% C and 3.1% H calculated for tin β-chlorethyl vinylphosphonate.

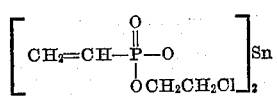

As illustrative of the light stabilizing properties of the metallo β-chlorethyl vinylphosphonates of this invention, compositions comprising

| | A | B |
|---|---|---|
| | (Parts by Weight) | |
| Polyvinyl chloride | 100 | 100 |
| Di(2-ethylhexyl) phthalate | 50 | 50 |
| Mark XX* | 2 | 1 |
| Paraplex G-60* | 3 | 3 |
| Calcium β-chlorethyl vinylphosphonate | | 2 |

* Commercial light stabilizers for polyvinyl chloride. Mark XX is a triaryl phosphite which is fully described in an article entitled "Stabilizers for Vinyl Polymers" at page 310, first column of British Plastics, vol. 27 (1954). Paraplex G-60 is an ester of high molecular weight having a specific gravity of 0.990 at 25° C. which is fully described on page 1023 of Arthur K. Doolittle's "The Technology of Solvents and Plasticizers" (1954, John Wiley and Sons, Inc.).

are prepared by mixing polyvinyl chloride with the respective ingredients in the amounts set forth above on differential speed rolls at a roll temperature of 160° C. to form a homogeneous composition which is removed from the roll in the form of crude sheets. From the crude sheets there are molded finished sheets which are about 0.040 inch in thickness employing a molding cycle of three minutes at 160° C.

The light stability values set forth below are obtained after fadeometer exposure for the stated number of hours.

| Hours/Composition | A | B |
|---|---|---|
| 200 | yellowing | colorless. |
| 500 | red | Do. |
| 700 | | slight yellowing. |

While this invention has been described with respect to certain embodiments it is to be understood that it is not so limited and that variations and modifications thereof obvious to those skilled in the art may be made without departing from the spirit or scope of this invention.

This application is a continuation-in-part of my copending patent application Serial Number 517,897, filed June 24, 1955, and now abandoned.

What is claimed is:

1. Salts of the structural formula

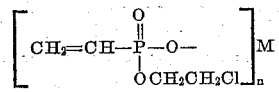

where M is a metal having a valence greater than 1, selected from the group consisting of tin, lead, antimony, bismuth, arsenic, copper, iron, cobalt, nickel, aluminum and metals of group II of the periodic table, and where n is the valence of the metal.

2. Salts of the structural formula

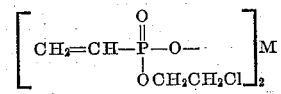

where M is a member of group II of the periodic table.

3. Salts of claim 2 wherein M is an alkaline earth metal.

4. Salt of claim 2 wherein M is calcium.
5. Salt of claim 2 wherein M is cadmium.
6. Salt of claim 2 wherein M is barium.
7. Salt of claim 2 wherein M is magnesium.
8. A salt of the structural formula

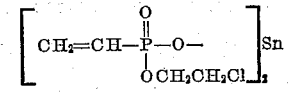

References Cited in the file of this patent

UNITED STATES PATENTS 2,784,206    Chadwick    Mar. 5, 1957